US011107279B1

(12) United States Patent
Cowburn et al.

(10) Patent No.: US 11,107,279 B1
(45) Date of Patent: Aug. 31, 2021

(54) 3D PAINT EFFECTS IN A MESSAGING SYSTEM

(71) Applicant: Snap Inc., Santa Monica, CA (US)

(72) Inventors: Piers George Cowburn, London (GB); Kyle Goodrich, Venice, CA (US); Samuel Edward Hare, Los Angeles, CA (US); Maxim Maximov Lazarov, Culver City, CA (US); David Li, London (GB); Tony Mathew, Los Angeles, CA (US); Andrew James McPhee, Culver City, CA (US); Daniel Moreno, Los Angeles, CA (US); Isac Andreas Müller Sandvik, London (GB); Wentao Shang, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/832,992

(22) Filed: Mar. 27, 2020

(51) Int. Cl.
*G06T 17/20* (2006.01)
*G06T 19/20* (2011.01)
*G06T 11/20* (2006.01)

(52) U.S. Cl.
CPC ............ *G06T 17/20* (2013.01); *G06T 11/203* (2013.01); *G06T 19/20* (2013.01); *G06T 2219/2012* (2013.01); *G06T 2219/2021* (2013.01)

(58) Field of Classification Search
CPC ....... G06T 17/20; G06T 11/203; G06T 19/20; G06T 2219/2012; G06T 2219/2021
See application file for complete search history.

(56) References Cited

U.S. PATENT DOCUMENTS

2020/0312029 A1* 10/2020 Heinen .................. G06T 7/579

OTHER PUBLICATIONS

Tech Connect, "Draw in 3D Space With AR Magic (3DBrush) This App Is Amazing!", YouTube video posted on Sep. 10, 2018. https://www.youtube.com/watch?v=xAXFr73cVxM (Year: 2018).*
Glitter Sparkles, "3DBrush", YouTube video posted on Nov. 11, 2018. https://www.youtube.com/watch?v=ccG7uAwhkBo (Year: 2018).*
Showhow2, "WhatsApp Messenger—How To Send A Video", YouTube video posted on Dec. 30, 2014. https://www.youtube.com/watch?v=cf-SXyjKiUk (Year: 2014).*

(Continued)

*Primary Examiner* — Chong Wu
(74) *Attorney, Agent, or Firm* — Schwegman Lundberg & Woessner, P.A.

(57) ABSTRACT

Systems and methods are provided for determining a location of a selection in a space viewable in a camera view on a display of a computing device, detecting movement of the computing device, and generating a path based on the location of the selection and the movement of the computing device. The systems and methods further provide for generating a three-dimensional (3D) mesh along the path, populating the 3D mesh with selected options to generate a 3D paint object, and causing the generated 3D paint object to be displayed. The systems and methods further provide for receiving a request to send a message comprising an image or video overlaid by the 3D paint object, capturing the image or video overlaid by the displayed 3D paint object, generating the message comprising the image or video overlaid by the 3D paint object, and sending the message to another computing device.

20 Claims, 12 Drawing Sheets

(56) References Cited

OTHER PUBLICATIONS

"3d brush app for android download", [Online] Retrieved from the Internet: <URL: http://mitchellzmxv.duckdns.org/3d-brush-app-for-android-download.html>, (Retrieved on Jan. 30, 2020), 8 pgs.

"ARmagic—AR Magic Effects", WearVR Virtual Reality App Store, [Online] Retrieved from the Internet: <URL: https://www.wearvr.com/>, (Retrieved on Jan. 30, 2020), 1 pg.

"LightSpace—3D Painting in Augmented Reality", Logical Animal Mobile App Product Consultants, [Online] Retrieved from the Internet: <URL: https://logicalanimal.com/lightspaceapp>, (Retrieved Jan. 30, 2020), 6 pgs.

"Tilt Brush by Google", [Online] Retrieved from the Internet: <URL: https://www.tiltbrush.com/>, (Retrieved on Jan. 30, 2020), 14 pgs.

\* cited by examiner

3D PAINT EFFECTS IN A MESSAGING SYSTEM

BACKGROUND

A content sharing platform may receive millions of messages from users desiring to share media content such as audio, images, and video between user devices (e.g., mobile devices, personal computers, etc.). The media content of these messages may be associated with a common geolocation, a common time period, a common event, and so forth.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods described herein relate to generating three-dimensional (3D) paint effects in a messaging system. For example, a user of a messaging application on a computing device may access a camera function of the messaging application. In example embodiments, in the camera view of the messaging application, the user accesses a 3D paint function to generate a 3D object in the camera view of the display. For instance, the camera view (e.g., via an outwardly or rear facing camera on the computing device) may be showing a scene in front of the camera or a camera view (e.g., via an inwardly or front facing camera) may be showing a view of the user's face. In one example embodiment, the user can draw a 3D paint line (e.g., a shape, mustache, text, or the like) by touching a touch screen of a display of the computing device and moving the device. The user can move the computing device around to continue drawing the 3D paint line, to view a generated 3D paint line or object from different angles, and so forth. The user can then capture an image or video via the camera of the computing device augmented or overlaid by the 3D paint object.

In one example embodiment, the user can send a message comprising the image or video overlaid by the 3D paint object to one or more other users. In another example embodiment, the user can send the 3D paint object as a 3D object to one or more other users. The one or more other users can use the 3D object to augment or overlay an image or video captured on a computing device and send a message comprising the captured image or video overlaid by the 3D object as a message to one or more other users.

Figure 1:
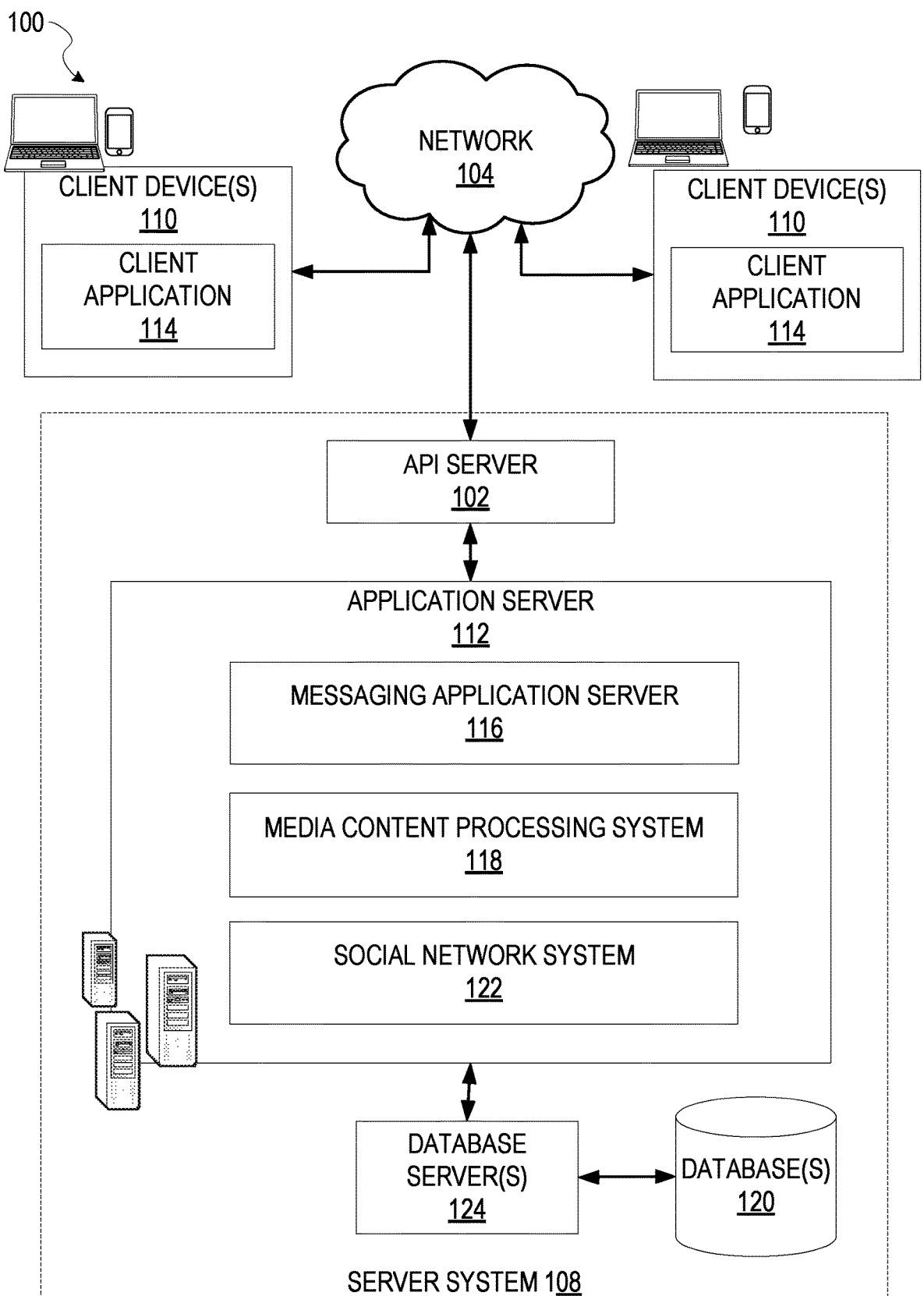
FIG. 1 is a block diagram showing an example networked system for exchanging data (e.g., messages and associated content) over a network, according to some example embodiments.

FIG. 1 is a block diagram illustrating a networked system 100 (e.g., a content sharing platform or messaging system) for exchanging data (e.g., messages and associated content) over a network. The networked system 100 includes multiple client devices 110, each of which hosts a number of client applications 114. Each client application 114 is communicatively coupled to other instances of the client application 114 and a server system 108 via a network 104.

The client device 110 may comprise, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, computer in a vehicle, wearable device, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, Global Positioning System (GPS) devices, and so forth.

The client device 110 may be a device of a user that is used to create media content items such as video, images (e.g., photographs), audio, and media overlays and to send and receive messages containing such media content items, text, media overlays, and so forth, to and from other users. The client device 110 may be a device of a user that is used to create and edit messages comprising media content, including video, one or more images (e.g., photographs), media overlays or other creative tools, text, and so forth. The client device 110 may further be a device of a user that is used to view and generate interactive messages, view other users on a map, chat (e.g., exchange text messages) with other users of the system, generate and view event invites, join an event, receive notifications related to an event, generate 3D effects, and so forth.

One or more users may be a person, a machine, or other means of interacting with the client device 110. In example embodiments, the user may not be part of the system 100 but may interact with the system 100 via the client device 110 or other means. For instance, the user may provide input (e.g., touch screen input or alphanumeric input) to the client device 110, and the input may be communicated to other entities in the system 100 (e.g., third-party servers, the server system 108, etc.) via the network 104. In this instance, the other entities in the system 100, in response to receiving the input from the user, may communicate information to the client device 110 via the network 104 to be presented to the user. In this way, the user may interact with the various entities in the system 100 using the client device 110.

The system 100 may further include the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WI-FI network, a WiMax network, another type of network, or a combination of two or more such networks.

The client device 110 may access the various data and applications provided by other entities in the system 100 via a web client (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, a messaging application, an electronic mail (email) application, an e-commerce site application, a mapping or location application, a media overlay application, an interactive messaging application, an image or video capture application, an event planning application, and the like.

In some embodiments, one or more client applications 114 may be included in a given one of the client devices 110, and configured to locally provide a user interface and at least some of the functionalities of the application, with the client application 114 configured to communicate with other entities in the system 100 (e.g., third-party servers, the server system 108, etc.), on an as-needed basis, for data and/or processing capabilities not locally available (e.g., to process user queries, to authenticate a user, to verify a method of payment, etc.). Conversely, one or more client applications 114 may not be included in the client device 110, and then the client device 110 may use its web browser to access the one or more applications hosted on other entities in the system 100 (e.g., third-party servers, the server system 108, etc.).

In one example, a client application 114 may be a messaging application that allows a user to take a photograph or video, add a caption or otherwise edit the photograph or video, and then send the photograph or video to another user. In one example, the message may be ephemeral and be removed from a receiving user device after viewing or after a predetermined amount of time (e.g., 10 seconds, 24 hours). An ephemeral message refers to a message that is accessible for a time-limited duration. An ephemeral message may be a text, an image, a video, and other such content that may be stitched or joined together in accordance with embodiments described herein. The access time for the ephemeral message may be set by the message sender. Alternatively, the access time may be a default setting or a setting specified by the recipient. Regardless of the setting technique, the message is transitory.

The messaging application may further allow a user to create a gallery or message collection. A gallery may be a collection of photos and videos which may be viewed by other users "following" the user's gallery (e.g., subscribed to view and receive updates in the user's gallery). In one example, the gallery may also be ephemeral (e.g., lasting 24 hours, lasting for a duration of an event (e.g., during a music concert, sporting event), or lasting another predetermined time).

An ephemeral message may be associated with a message duration parameter, the value of which determines an amount of time that the ephemeral message will be displayed to a receiving user of the ephemeral message by the client application 114. The ephemeral message may be further associated with a message receiver identifier and a message timer. The message timer may be responsible for determining the amount of time the ephemeral message is shown to a particular receiving user identified by the message receiver identifier. For example, the ephemeral message may only be shown to the relevant receiving user for a time period determined by the value of the message duration parameter.

In another example, the messaging application may allow a user to store photographs and videos and create a gallery that is not ephemeral and that can be sent to other users. For example, a user may assemble photographs and videos from a recent vacation to share with friends and family.

The messaging application may further allow a user to generate 3D effects and apply the 3D effects to an image or video or other aspect of a message. The messaging application may allow the user to send the 3D effects as a 3D object or as part of a message (e.g., overlaid on an image or video). Further details are described below.

The server system 108 may provide server-side functionality via the network 104 (e.g., the Internet or a wide area network (WAN)) to one or more client devices 110 and/or one or more third-party servers (not shown). The server system 108 may include an application programming interface (API) server 102, an application server 112, a messaging application server 116, a media content processing system 118, and a social network system 122, which may be communicatively coupled with each other and with one or more data storages, such as one or more databases 120.

The server system 108 may be a cloud computing environment, according to some example embodiments. The server system 108, and any servers associated with the server system 108, may be associated with a cloud-based application, in one example embodiment.

The one or more databases 120 may be storage devices that store information such as untreated media content, original media content from users (e.g., high-quality media content), processed media content (e.g., media content that is formatted for sharing with client devices 110 and viewing on client devices 110), context data related to a media content item, context data related to a user device (e.g., a computing or client device 110), media overlays, media overlay smart widgets or smart elements, user data, user device information, media content (e.g., video and images), media content data (e.g., data associated with video and images), computing device context data, serialized data, session data items, user device location data, mapping information, interactive message usage data, interactive message metrics data, event details and tokens, 3D effects, 3D objects, and so forth. The one or more databases 120 may further store information related to third-party servers, third-party applications, client devices 110, client applications 114, users, and so forth.

The one or more databases 120 may include cloud-based storage external to the server system 108 (e.g., hosted by one or more third-party entities external to the server system 108). While the storage devices are shown as database(s) 120, it is to be understood that the system 100 may access and store data in storage devices such as databases 120, blob storages, and other types of storage methods.

The system 100 may further include one or more third-party servers (not shown). The one or more third-party servers may include one or more third-party applications. The one or more third-party applications, executing on the third-party server(s), may interact with the server system 108 via the API server 102 via a programmatic interface provided by the API server 102. For example, one or more of the third-party applications may request and utilize information from the server system 108 via the API server 102 to support one or more features or functions on a website hosted by a third party or an application hosted by the third party. The third-party website or application, for example, may provide functionality that is supported by relevant functionality and data in the server system 108.

Accordingly, each client application 114 is able to communicate and exchange data with other client applications 114 and with the server system 108 via the network 104. The data exchanged between client applications 114, and between a client application 114 and the server system 108, includes functions (e.g., commands to invoke functions) as well as payload data (e.g., text, audio, video, or other multimedia data).

The server system 108 provides server-side functionality via the network 104 to a particular client application 114. While certain functions of the system 100 are described herein as being performed either by a client application 114 or by the server system 108, it will be appreciated that the location of certain functionality either within the client application 114 or within the server system 108 is a design choice. For example, it may be technically preferable to initially deploy certain technology and functionality within the server system 108, but to later migrate this technology and functionality to the client application 114 where a client device 110 has a sufficient processing capacity.

The server system 108 supports various services and operations that are provided to the client application 114. Such operations include transmitting data to, receiving data from, and processing data generated by the client application 114. This data may include message content, client device information, geolocation information, media annotation and overlays, message content persistence conditions, social network information, live event information, date and time stamps, media content (e.g., video and images), media content data (e.g., data associated with video and images), interactive message usage data, event planning data, and data corresponding to 3D effects, as examples. Data exchanges within the networked system 100 are invoked and controlled through functions available via user interfaces (UIs) of the client application 114.

In the server system 108, the API server 102 is coupled to, and provides a programmatic interface to, the application server 112. The application server 112 is communicatively coupled to a database server 124, which facilitates access to the one or more databases 120 in which is stored data associated with messages processed by the application server 112.

The API server 102 receives and transmits message data (e.g., commands and message payloads) between the client device 110 and the application server 112. Specifically, the API server 102 provides a set of interfaces (e.g., routines and protocols) that can be called or queried by the client application 114 in order to invoke functionality of the application server 112. The API server 102 exposes various functions supported by the application server 112, including account registration; login functionality; the sending of messages, via the application server 112, from a particular client application 114 to another client application 114; the sending of media files (e.g., images or video) from a client application 114 to the messaging application server 116, for possible access by another client application 114; the setting of a collection of media data (e.g., a gallery, story, message collection, or media collection); the retrieval of such collections; the retrieval of a list of friends of a user of a client device 110; the retrieval of messages and content; the adding of friends to and deletion of friends from a social graph; the location of friends within a social graph; opening an application event (e.g., relating to the client application 114); mapping data; the creation and generation of a media overlay, and so forth.

The application server 112 hosts a number of applications and subsystems, including the messaging application server 116, the media content processing system 118, and the social network system 122. The messaging application server 116 implements a number of message processing technologies and functions, particularly related to the aggregation and other processing of content (e.g., textual and multimedia content) included in messages received from multiple instances of the client application 114. The text and media content from multiple sources may be aggregated into collections of content (e.g., called stories, galleries, or media collections). These collections are then made available, by the messaging application server 116, to the client application 114. Other processor- and memory-intensive processing of data may also be performed server-side by the messaging application server 116, in view of the hardware requirements for such processing.

The application server 112 also includes the media content processing system 118, which is dedicated to performing various media content processing operations, typically with respect to images or video received within the payload of a message at the messaging application server 116. The media content processing system 118 may access one or more data storages (e.g., the database(s) 120) to retrieve stored data to use in processing media content and to store results of processed media content.

The social network system 122 supports various social networking functions and services, and makes these functions and services available to the messaging application server 116. To this end, the social network system 122 maintains and accesses an entity graph 304 (depicted in FIG. 3) within the database(s) 120. Examples of functions and services supported by the social network system 122 include the identification of other users of the networked system 100 with whom a particular user has relationships or whom the particular user is "following," and also the identification of other entities and interests of a particular user.

The messaging application server 116 may be responsible for generation and delivery of messages between users of client devices 110. The messaging application server 116 may utilize any one of a number of message delivery networks and platforms to deliver messages to users. For example, the messaging application server 116 may deliver messages using electronic mail (email), instant messaging (IM), Short Message Service (SMS), text, facsimile, or voice (e.g., Voice over IP (VoIP)) messages via wired networks (e.g., the Internet), plain old telephone service (POTS), or wireless networks (e.g., mobile, cellular, WIFI, Long Term Evolution (LTE), or Bluetooth).

Figure 2:
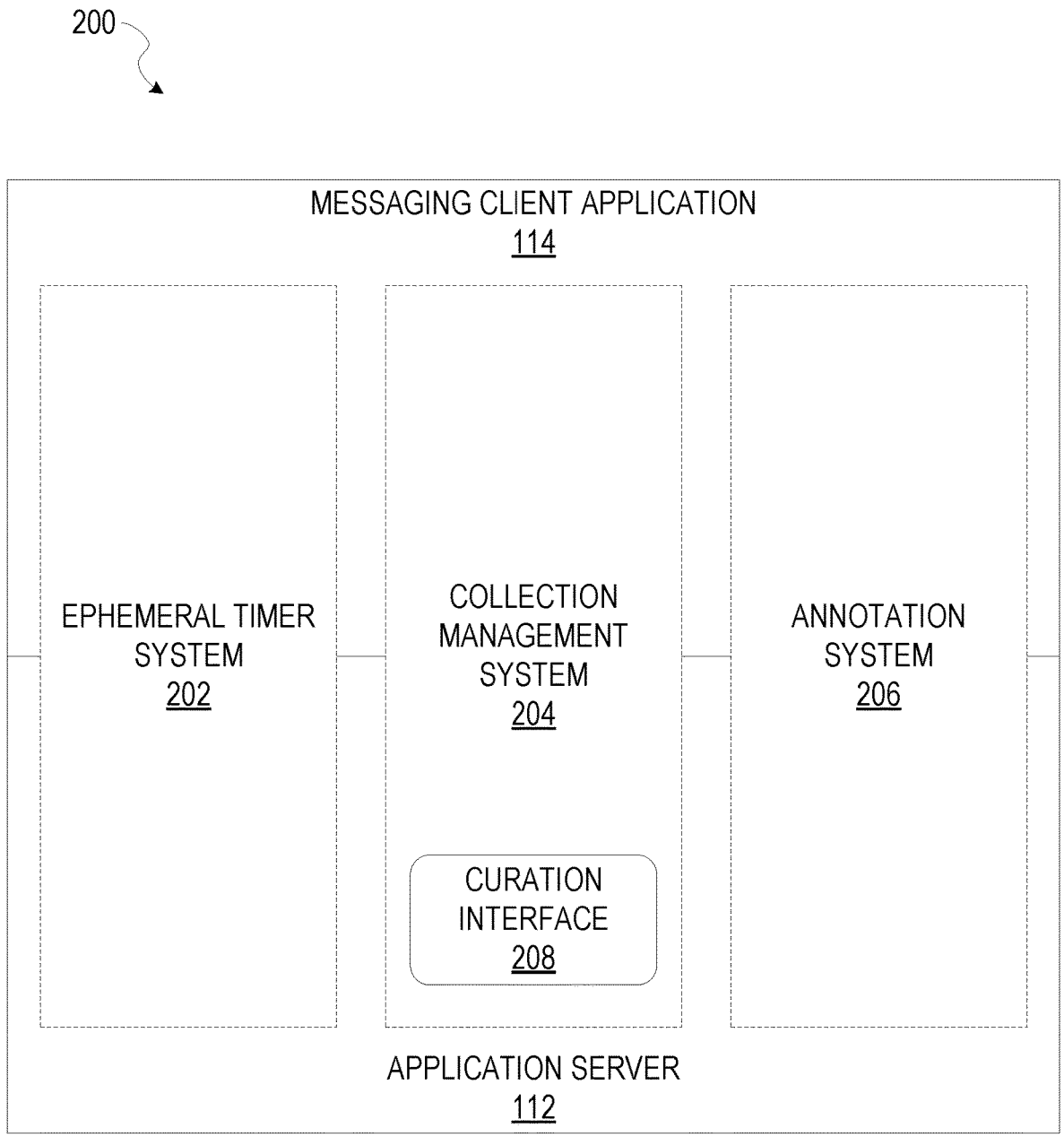
FIG. 2 is a block diagram illustrating further details regarding the messaging system, according to some example embodiments.

FIG. 2 is a block diagram 200 illustrating further details regarding the system 100, according to example embodiments. Specifically, the system 100 is shown to comprise the messaging client application 114 and the application server 112, which in turn embody a number of subsystems, namely an ephemeral timer system 202, a collection management system 204, and an annotation system 206.

The ephemeral timer system 202 is responsible for enforcing the temporary access to content permitted by the messaging client application 114 and the messaging application server 116. To this end, the ephemeral timer system 202 incorporates a number of timers that, based on duration and display parameters associated with a message, or a collection of messages (e.g., otherwise referred to herein as "media collections," "galleries," "message collections," "stories," and the like), selectively display and enable access to messages and associated content via the messaging client application 114.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 114.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation (e.g., money, non-money credits or points associated with the messaging system or a third-party reward system, travel miles, access to artwork or specialized lenses, etc.) may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the networked system 100. In one example, the annotation system 206 operatively supplies a media overlay (e.g., a filter or media augmentation) to the messaging client application 114 based on a geolocation of the client device 110. In another example, the annotation system 206 operatively supplies a media overlay to the messaging client application 114 based on other information, such as social network information of the user of the client device 110.

A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 110. For example, the media overlay includes text that can be overlaid on top of a photograph taken by the client device 110. In another example, the media overlay includes an identification of a location overlay (e.g., Venice Beach), a name of a live event, a name of a merchant overlay (e.g., Beach Coffee House), or of a home of a user. In another example, the annotation system 206 uses the geolocation of the client device 110 to identify a media overlay that includes the name of a merchant at the geolocation of the client device 110. The media overlay may include other indicia associated with the merchant. In another example, a media overlay includes 3D effects, as described further below. The media overlays may be stored in the database(s) 120 and accessed through the database server 124.

The annotation system 206 may further enable a user to interact with an interactive message, such as by adding one or more media content items to the interactive message, as described in further detail below. In one example embodiment, the annotation system 206 provides a publication platform that allows a user or merchant to create an interactive message with a plurality of objects associated with the interactive message for which users may add personal content. For example, a designer may create a video of a rock band with various interactive objects for different members of the band (a drummer, a keyboard player, a guitarist, etc.). The video of the rock band may be made available to users as an interactive message.

In one example embodiment, the annotation system 206 provides a user-based publication platform that enables users to select a geolocation on a map and upload content associated with the selected geolocation. The user may also specify circumstances under which a particular media overlay is to be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

Figure 3:
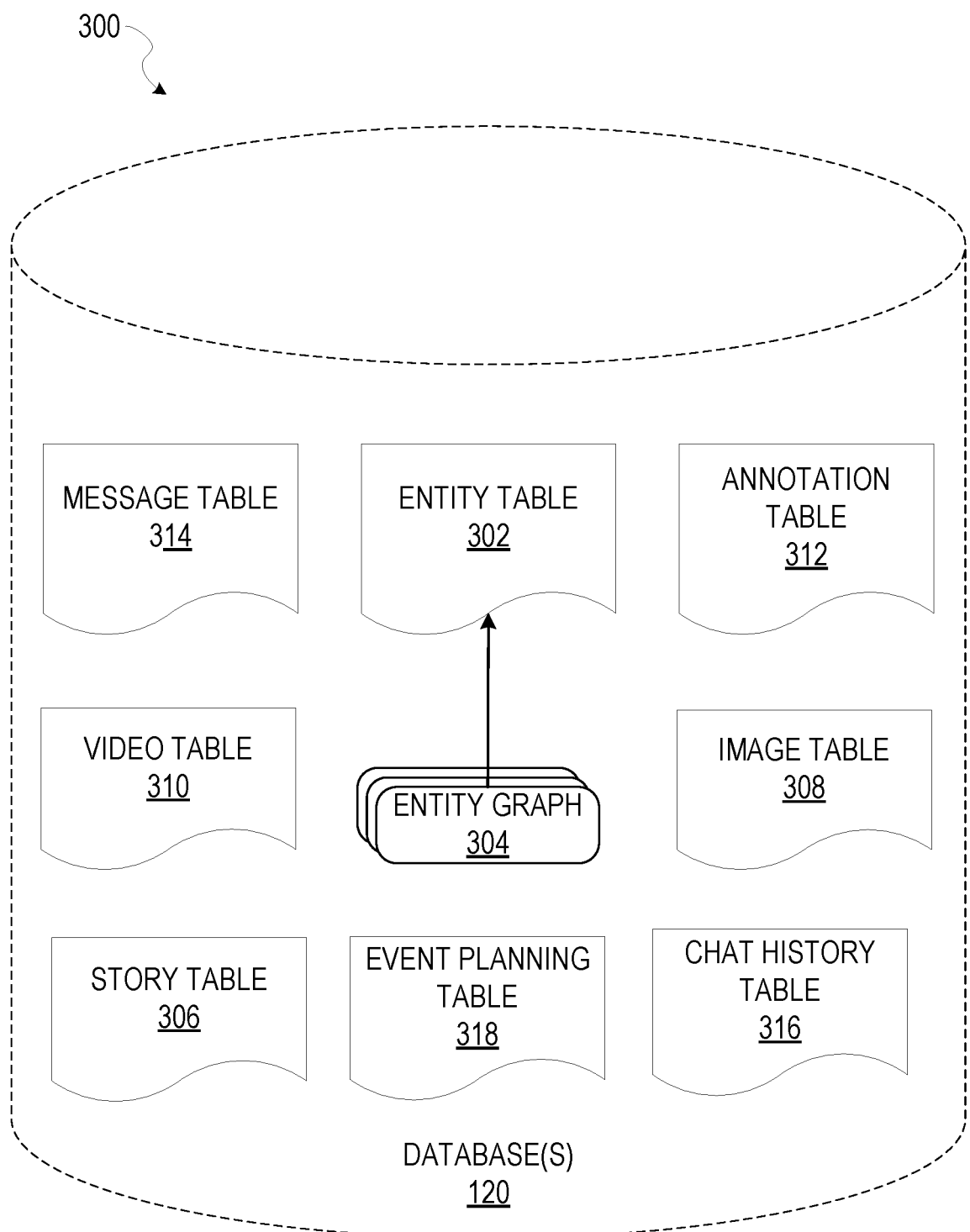
FIG. 3 is a schematic diagram illustrating data which may be stored in a database of a messaging server system, according to some example embodiments.

FIG. 3 is a schematic diagram 300 illustrating data which may be stored in the database(s) 120 of the server system 108, according to certain example embodiments. While the content of the database(s) 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization), interested-based, or activity-based, merely for example.

The database 120 also stores annotation data, in the example form of media overlays or filters, in an annotation table 312. Annotation data may also be referred to herein as "creative tools" or "interactive features." Annotation data may comprise predefined interactive messages to be provided to users.

Media overlays or filters, for which data is stored within the annotation table 312, are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 114 when the sending user is composing a message. Other types of filters include geolocation filters (also known as "geofilters"), which may be presented to a sending user based on geographic location. For example, geolocation filters specific to a neighborhood or special location may be presented within a user interface by the messaging client application 114, based on geolocation information determined by a GPS unit of the client device 110. Another type of filter is a data filter, which may be selectively presented to a sending user by the messaging client application 114, based on other inputs or information gathered by the client device 110 during the message creation process. Examples of data filters include a current temperature at a specific location, a current speed at which a sending user is traveling, a battery life for a client device 110, or the current time.

Other annotation data that may be stored within the annotation table 312 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story, gallery, or media collection). The creation of a particular collection may be initiated by a particular user (e.g., any user for whom a record is maintained in the entity table 302). A user may create a "personal story" in the form of a collection of content that has been created and sent/broadcast by that user. To this end, the user interface of the messaging client application 114 may include an icon that is user-selectable to enable a sending user to add specific content to his or her personal story.

A media or message collection may also constitute a "live story," which is a collection of content from multiple users that is created manually, automatically, or using a combination of manual and automatic techniques. For example, a "live story" may constitute a curated stream of user-submitted content from various locations and events. Users whose client devices 110 have location services enabled and are at a common event location at a particular time may, for example, be presented with an option, via a user interface of the messaging client application 114, to contribute content to a particular live story. The live story may be identified to the user by the messaging client application 114, based on his or her location. The end result is a "live story" told from a community perspective.

A further type of content collection is known as a "location story," which enables a user whose client device 110 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

A chat history table 316 stores data related to text messages exchanged between users in a "chat" session via the messaging application. For example, the chat history table 316 stores all the messages exchanged between users, or all messages for a predefined time period (e.g., last hour, day, week, month, year), so that a user may view a history of text messages the user exchanged between one or more other users.

An event planning table 318 stores data related to an event. For example, the event planning table 318 stores details of an event, logged events (e.g., actions) corresponding to the event (e.g., when a user joins the event, when a user invites another users, when details of the event change), links to chat sessions for the event (e.g., a link to chat sessions in the chat history table 316), tokens for the event, and so forth.

Figure 4:
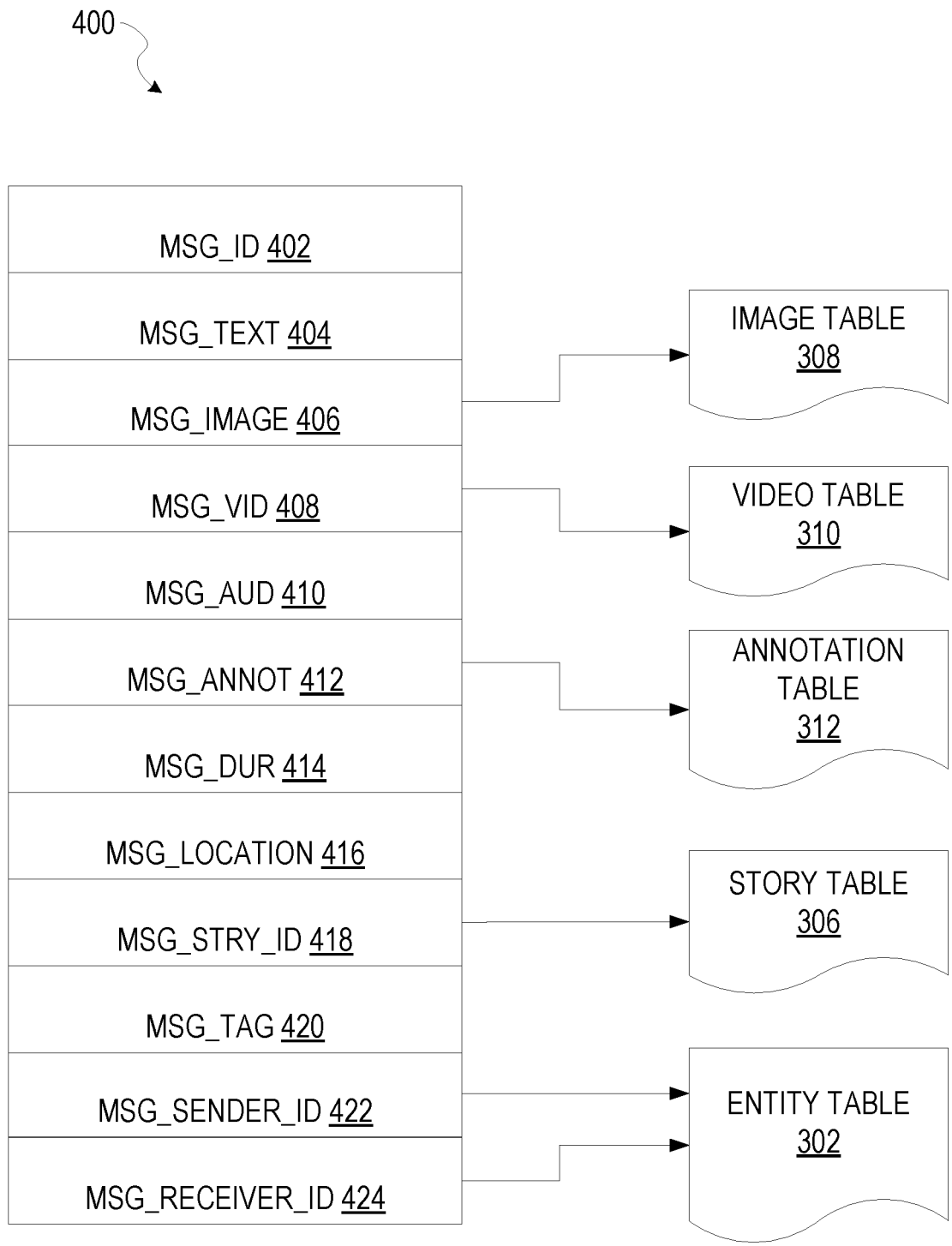
FIG. 4 is a schematic diagram illustrating a structure of a message, according to some embodiments, generated by a messaging client application for communication.

FIG. 4 is a schematic diagram illustrating a structure of a message 400, according to some embodiments, generated by a client application 114 for communication to a further client application 114 or the messaging application server 116. The content of a particular message 400 is used to populate the message table 314 stored within the database(s) 120, accessible by the messaging application server 116. Similarly, the content of a message 400 is stored in memory as "in-transit" or "in-flight" data of the client device 110 or the application server 112. The message 400 is shown to include the following components:

A message identifier 402: a unique identifier that identifies the message 400.

A message text payload 404: text, to be generated by a user via a user interface of the client device 110 and that is included in the message 400.

A message image payload 406: image data, captured by a camera component of a client device 110 or retrieved from memory of a client device 110, and that is included in the message 400.

A message video payload 408: video data, captured by a camera component or retrieved from a memory component of the client device 110 and that is included in the message 400.

A message audio payload 410: audio data, captured by a microphone or retrieved from the memory component of the client device 110, and that is included in the message 400.

Message annotations 412: annotation data (e.g., media overlays such as filters, stickers, or other enhancements) that represents annotations to be applied to the message image payload 406, message video payload 408, or message audio payload 410 of the message 400.

A message duration parameter 414: a parameter value indicating, in seconds, the amount of time for which content of the message 400 (e.g., the message image payload 406, message video payload 408, and message audio payload 410) is to be presented or made accessible to a user via the messaging client application 114.

A message geolocation parameter 416: geolocation data (e.g., latitudinal and longitudinal coordinates) associated with the content payload of the message 400. Multiple message geolocation parameter 416 values may be included in the payload, each of these parameter values being associated with respective content items included in the content (e.g., a specific image within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 110 on which the message 400 was generated and from which the message 400 was sent.

A message receiver identifier 424: an identifier (e.g., a messaging system identifier, email address, or device identifier) indicative of a user of the client device 110 to which the message 400 is addressed.

An event token (not shown): an identifier (e.g., randomly generated number) indicative of the event.

The contents (e.g., values) of the various components of the message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

As explained above, a messaging application on a computing device may comprise 3D effects functionality that allows a user to draw a 3D paint line in a camera view displayed on the computing device to generate a 3D object. It is to be understood that this is just one example of the 3D effects functionality; in example embodiments, the 3D effects functionality can be a stand-alone application or functionality separate from a messaging application or included in another application.

Figure 5:
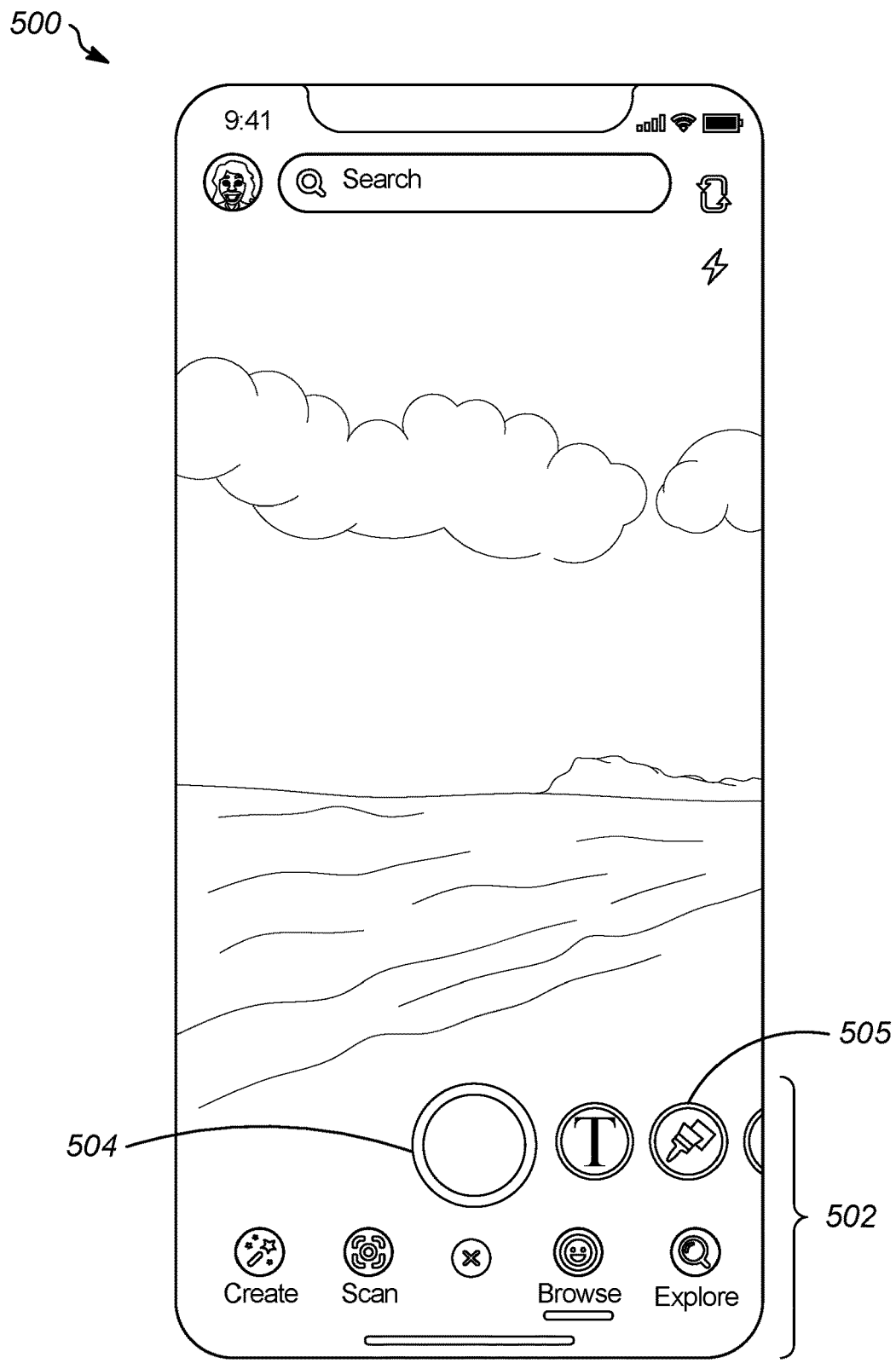
FIGS. 5-9 illustrate example graphical user interfaces (GUIs), according to some example embodiments.

FIG. 5 illustrates an example graphical user interface (GUI) 500 showing a camera view on a display of a computing device. In this example, the view is via a rear-facing camera showing a beach scene. The GUI 500 comprises several options 502 to select for various functionality. For example, the options 502 include an option 504 to capture an image or video (e.g., a photograph of the beach scene or video of the beach scene) and option 505 for 3D paint functionality. A user can select the option 505 to generate a 3D paint object in the camera view.

Figure 6:
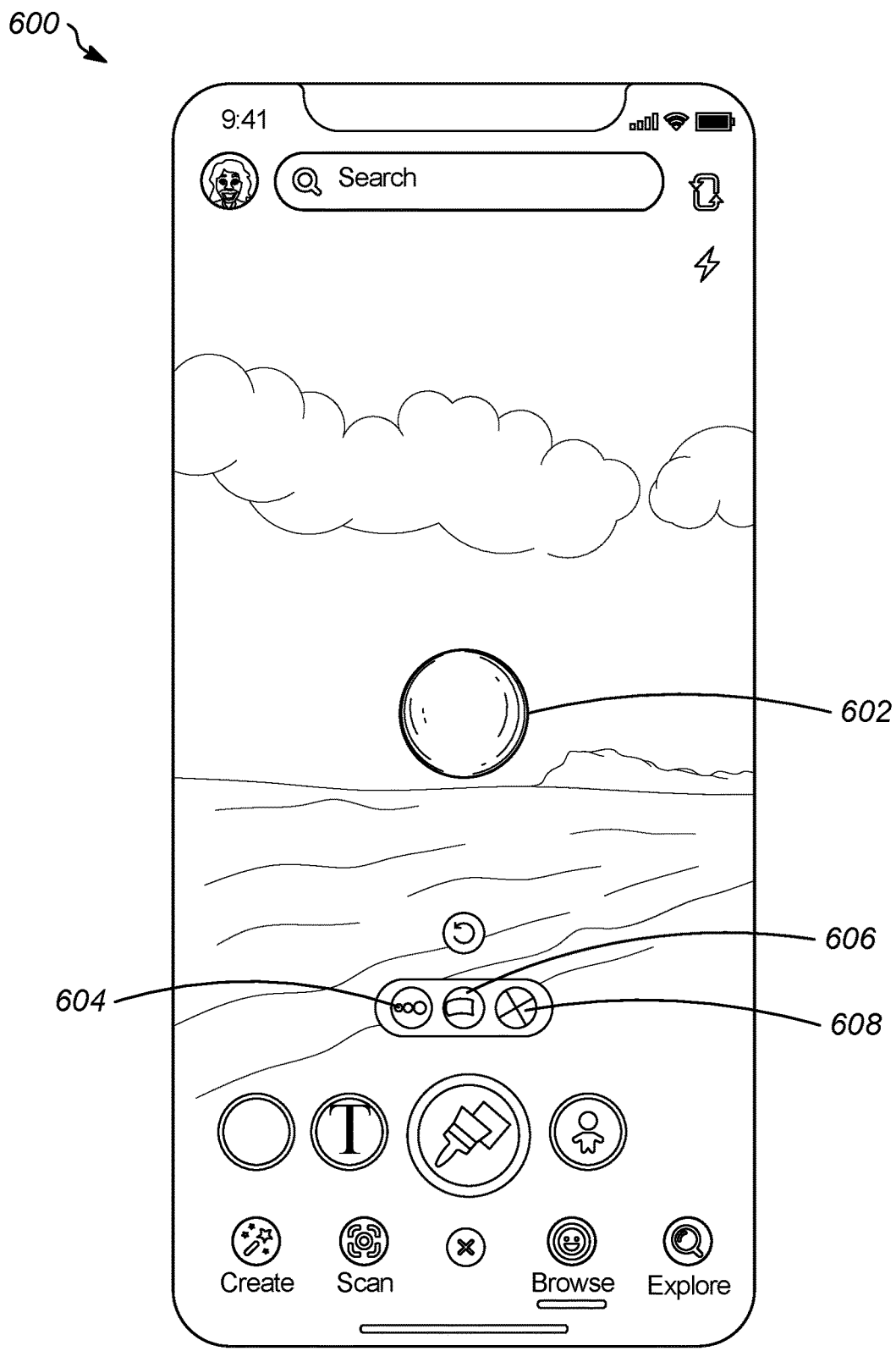

FIG. 6 illustrates an example GUI 600 after a user has selected option 505 for 3D paint functionality. The GUI 600 includes, among other options, an option 602 to draw a 3D paint line, an option 604 to select or adjust the brush size for the 3D paint line, an option 606 to select a brush style or texture type for the 3D paint line, and an option 608 to select a color for the 3D paint line. A GUI may further provide other options for the 3D paint line, such as a shape or type (e.g., cylindrical, polygon, hotdog, smiley face, or other shape).

Figure 7:
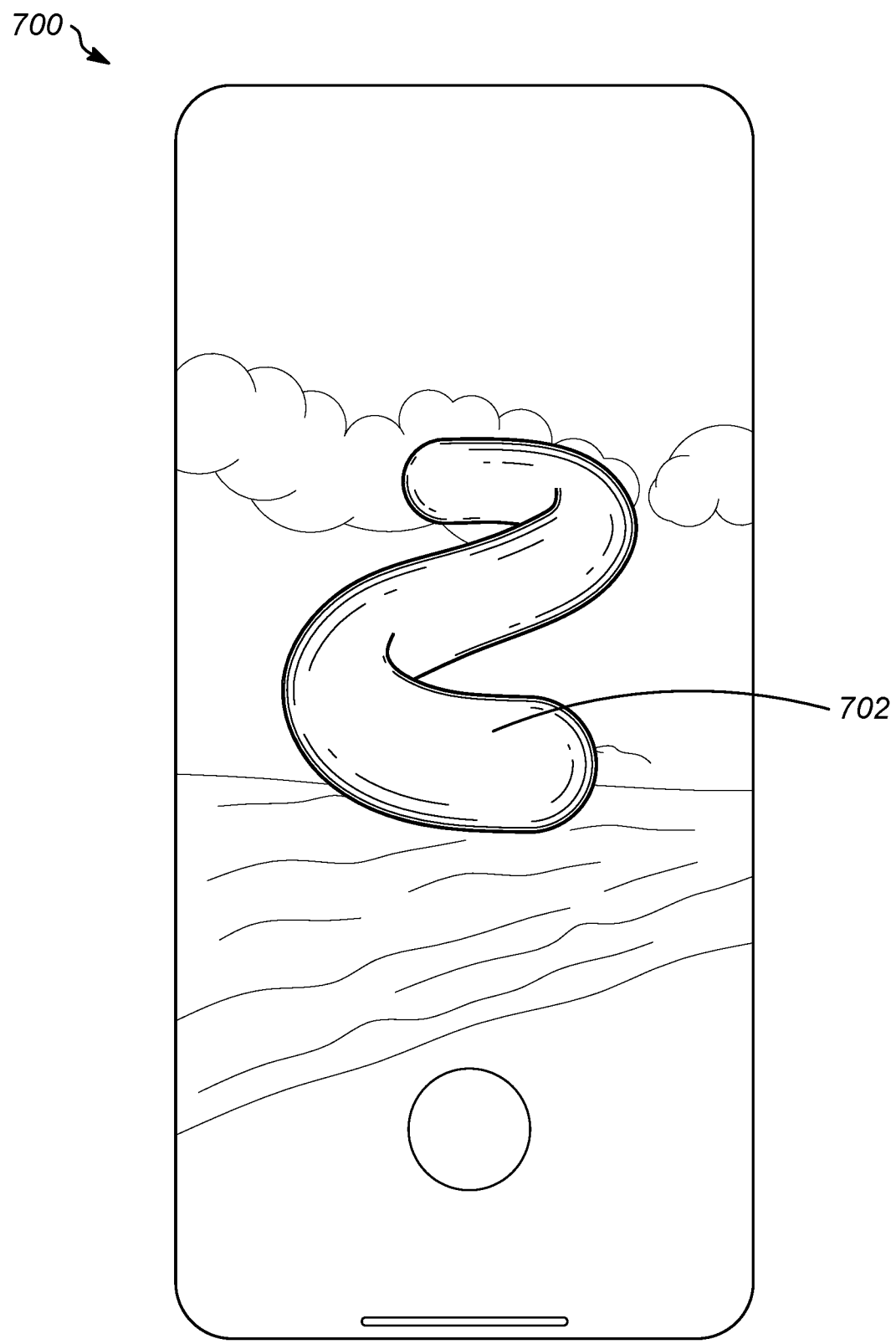

Once the user selects the option 602 to draw the 3D paint line, the user can move the computing device or use a finger or other means to draw the 3D paint line in the camera view (e.g., to draw text, a shape, and so forth). FIG. 7 illustrates a GUI 700 with a simple example of a 3D paint object 702 that a user has drawn. The user can move the computing device to view the 3D paint object from other angles in the camera view.

In one example embodiment, the user can switch between drawing the 3D paint line in a rear-facing camera view to a front-facing camera view, and vice versa. In one example embodiment, if a user switches to a different facing camera view (e.g., rear-facing to front-facing or vice versa), the previously painted 3D line is hidden and if the user switches back to the original camera view, the previously painted 3D line will appear again. In an alternative embodiment, the 3D line appears in each camera view when the user switches between camera views.

In one example, the user can select an undo option to remove a paint stroke. In one example, portions of or the entire painted 3D line can be erased or deleted using an eraser brush.

Figure 8:
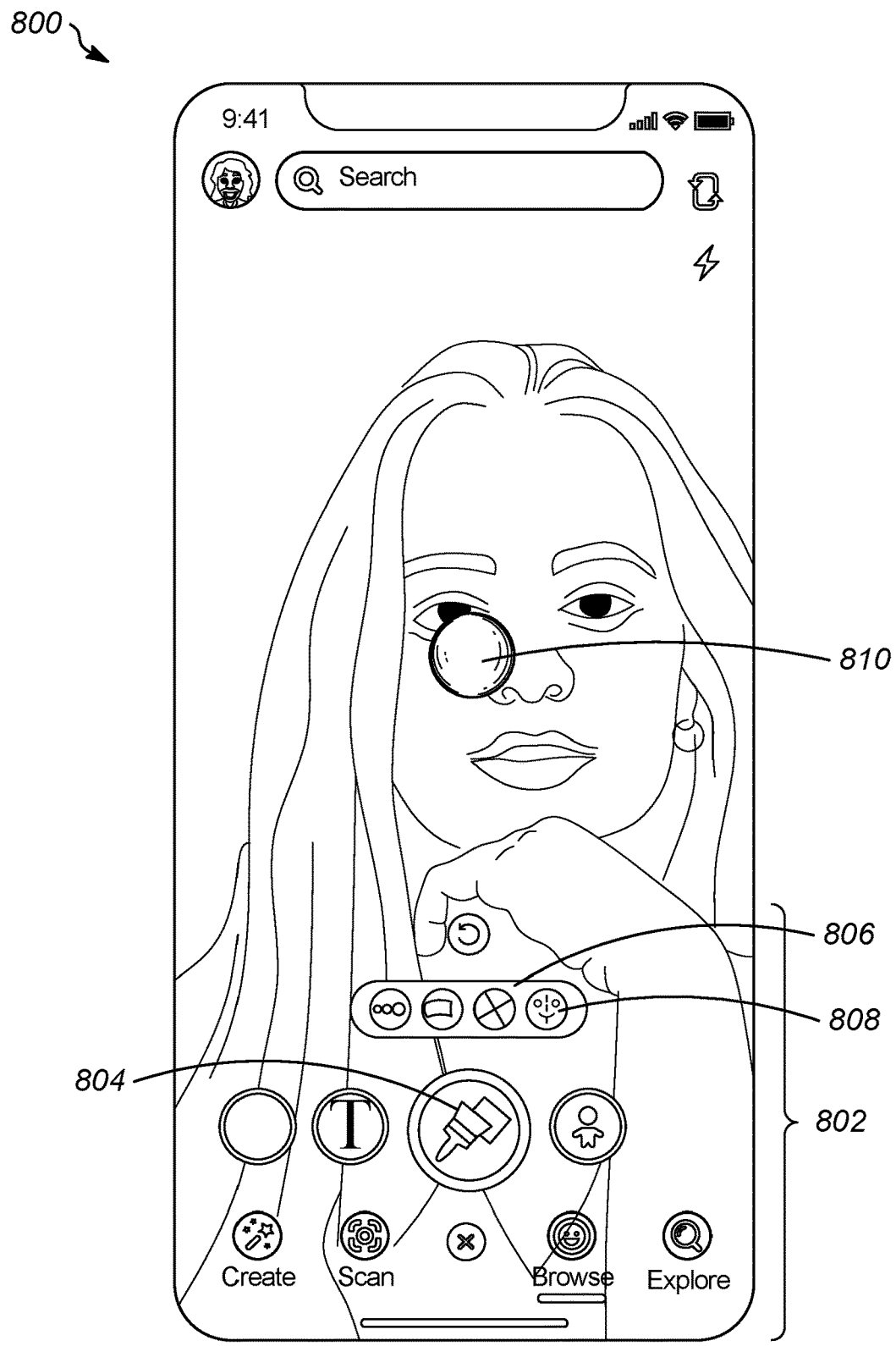

FIG. 8 illustrates an example GUI 800 showing a camera view on a display of a computing device. In this example, the view is via a front-facing camera showing a view of the user's face. The GUI 800 also comprises several options 802 to select for various functionality, as explained above with respect to FIG. 5. In this example, the option 804 for 3D paint functionality has been selected. As also explained above, the GUI 800 has several options 806 to select or adjust the brush size for the 3D paint line, to select a brush style or texture type for the 3D paint line, and to select a color for the 3D paint line. The GUI 800 further has an option 808 to select a symmetry mode for mirror functionality that allows a user to draw a 3D paint line on one side of a face (or other object) and the computing device will mirror the 3D paint line with a mirror version of it on the other side of the face (or other object). For example, a user can draw one side of a mustache or one eyebrow and the other side of the mustache or other eyebrow is automatically be generated by the computing device. The GUI 800 also has an option 810 to draw the 3D paint line, as explained above.

Figure 9:
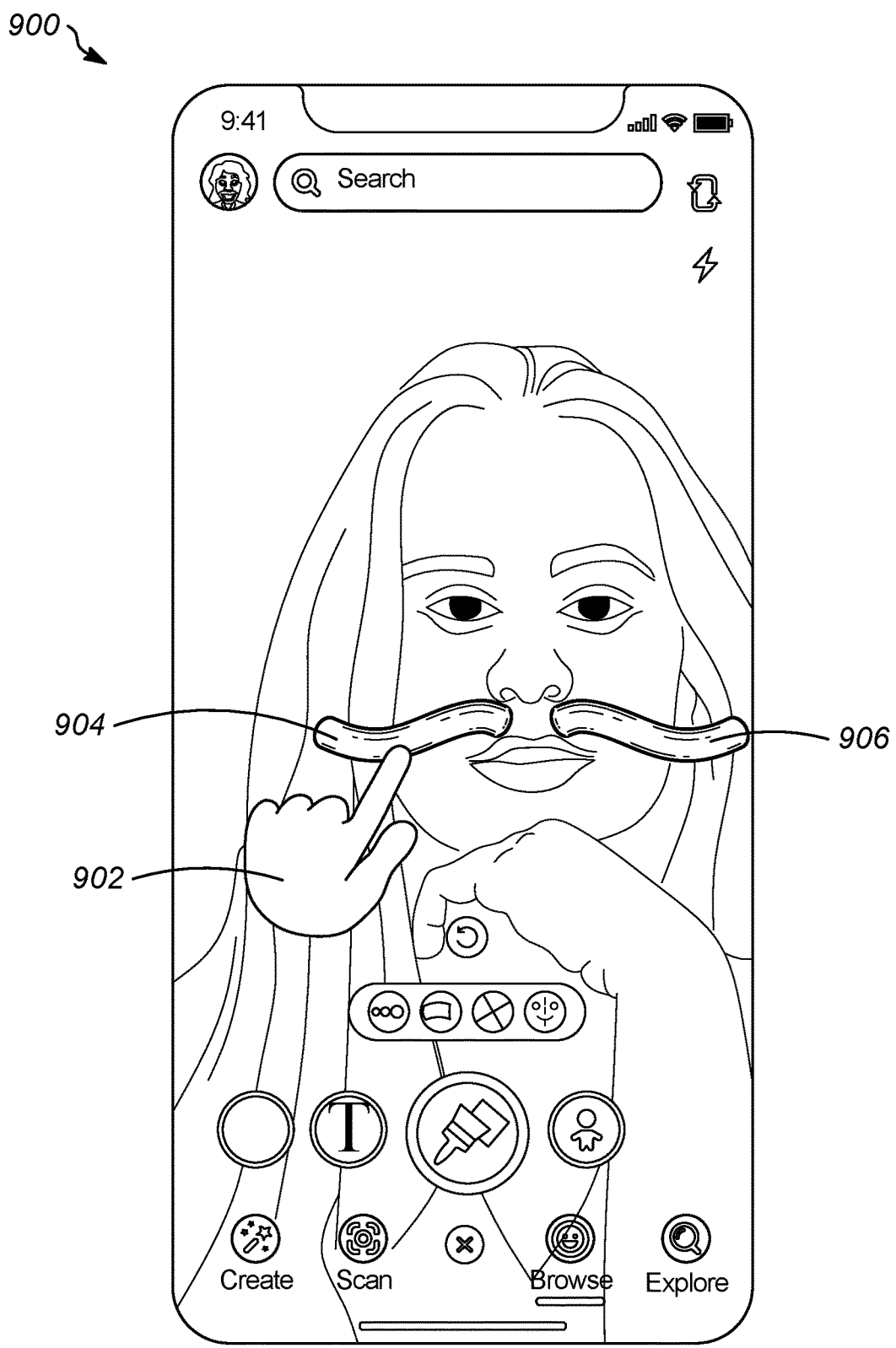

FIG. 9 illustrates an example GUI 900 that shows an indication 902 of a user's finger or hand drawing a 3D paint line 904 (e.g., the left side of a mustache). FIG. 9 further shows a 3D paint line 906 that has already been drawn or a line that is automatically drawn in a mirror or symmetry mode, as explained above.

Figure 10:
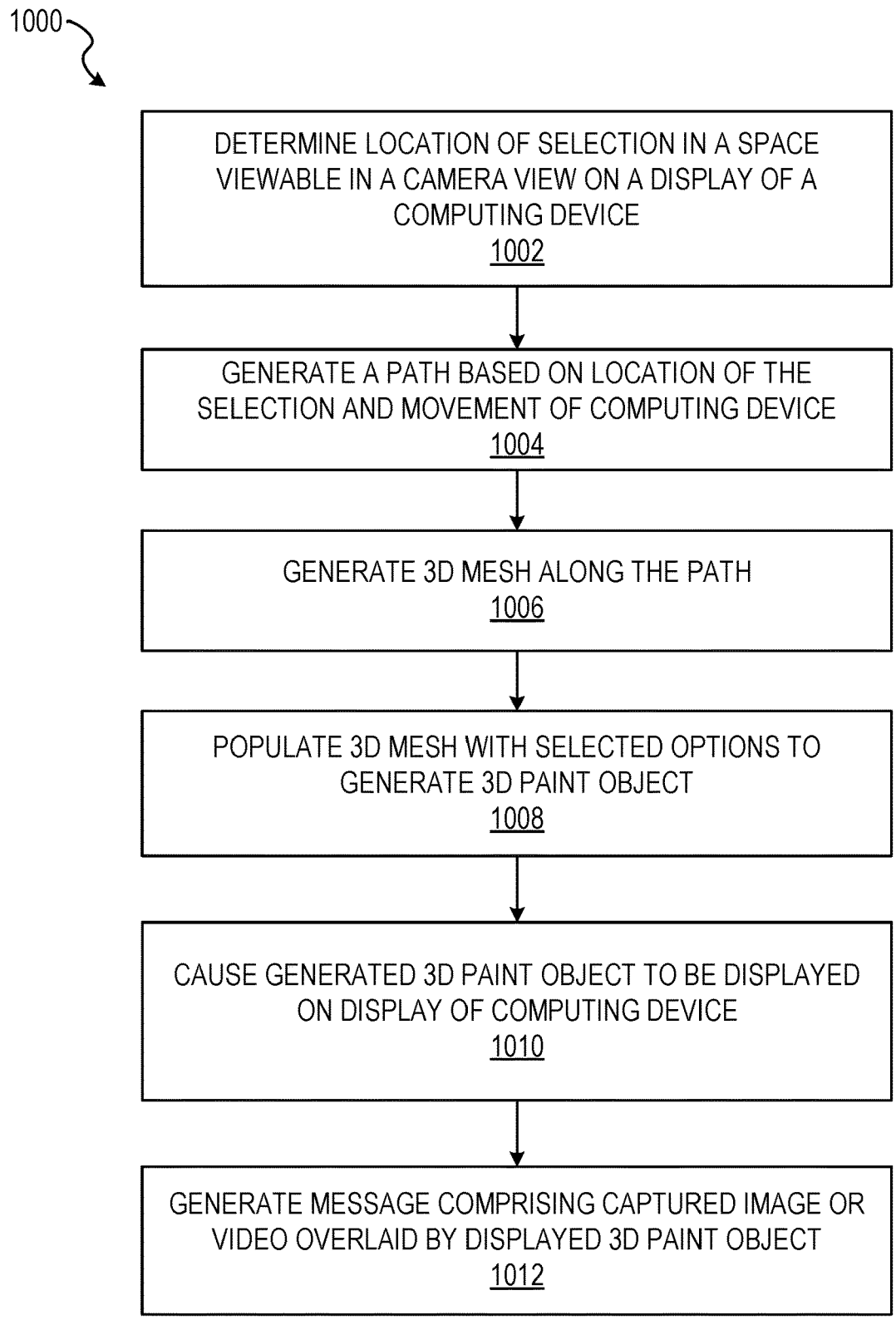
FIG. 10 is a flow chart illustrating aspects of a method, according to some example embodiments.

FIG. 10 is a flow chart illustrating aspects of a method 1000 for generating 3D effects, according to some example embodiments. For illustrative purposes, the method 1000 is described with respect to the networked system 100 of FIG. 1. It is to be understood that the method 1000 may be practiced with other system configurations in other embodiments.

In operation 1002, a computing device (e.g., client device 110) determines a location of a selection in a space viewable in a camera view on a display of the computing device. As explained above, a user selects (e.g., presses or presses and holds) a location on a display of the computing device while viewing a space in a camera view. The computing device detects that the user has pressed the location on the display and determines the location of the selection in the space viewable in the camera view. For example, the computing device determines an X, Y, and Z coordinate of the selected location in the space viewable in the camera view.

In one example, the computing device uses technologies provided in the operating system on the computing device or other techniques to track the space viewable in the camera view (e.g., via ARKit, ARCore, etc.). Example embodiments can use these underlying technologies to get 3D location data (e.g., X, Y, Z coordinates) and rotation data for the location of the user selection in the space viewable in the camera view.

In one example, the computing device detects movement of the computing device and determines the 3D location data (and/or rotation or other orientation data) for a specified number of frames (or sub-frames) or for specified time intervals to generate a 3D paint line and 3D paint object as the user moves the computing device during the selection, as described further below. In another example, the computing device uses the 3D location data, rotation data, and other data for displaying a generated 3D paint object and allowing a user to move the computing device to view the generated 3D paint object from different angles or directions.

As explained above, the user may draw a 3D paint line by using a finger or pointing device on the display or may draw the 3D paint line by moving the computing device while pressing a location on the display of the computing device. The computing device detects the finger or pointer movement or the movement of the computing device to generate a path based on the location of the selection (e.g., the location in space of the point on the display where the user is pressing) and the movement of the computing device or movement of the finger or pointer.

In operation 1004, the computing device generates the path based on the location of the selection and the movement of the computing device. For example, the computing device generates points along a path using multiple X, Y, and Z coordinates calculated based on the movement of the computing device. In one example, the computing device generates a point along the path at every n frame or sub-n frame (e.g., every 1 frame, every 2 frames, every ½ frame). In another example, the computing device generates a point along the path at specified time intervals (e.g., fraction of a second, a second). In this way the computing device determines a location for each point along a path of movement by the user selection. In one example, the path is generated by connecting these points.

One technical issue with generating the path is how to generate a smooth path so that the generated 3D paint line or object based on the path does not appear wobbly or shaky. For instance, if the path were generated solely on the points determined by the computing device, the path may be angular with sharp bends instead of a smooth curved line. Moreover, there may be small shakes or jitter in the line based on how the user is drawing the line (e.g., the path of movement of the computing device or user finger or pointer may not be smooth). To address this issue, the computing device applies a smoothing algorithm to the path, such as applying a simple moving average filter to input points, fitting a spline to the input points, using a smoothing spring system (e.g., Verlet-Stormer integration with spring constraints), or other method.

In operation 1006, the computing device generates a 3D mesh along the path. The 3D mesh can be generated using mesh generation techniques, such as a sweep/swept meshing which generates a 3D surface by sweeping a 2D profile along the points of a specified path, generating a coordinate frame used to align the profile at each point, using parallel transport, using Frenet-Serret frames, or other methods. In example embodiments, the 3D mesh comprises a cylindrical or polygon shape. FIG. 7 illustrates an example 3D object 702 that is generated from a 3D mesh comprising a cylindrical shape.

In other example embodiments, the 3D mesh comprises more than one shape (e.g., the 3D mesh can comprise a cylindrical shape and a polygon shape). In some example embodiments, each shape comprises its own options (e.g., color and texture type). For example, the 3D mesh can be a first 3D mesh comprising a shape of a hotdog bun and a second 3D mesh comprising the shape of toppings on the hotdog bun with the respective color and texture for a hotdog bun and toppings.

In operation 1008, the computing device populates the 3D mesh with selected options to generate a 3D paint object. As explained above, a user may select a number of options, such as a size, a style texture (e.g., texture type), a color, or other options for the 3D paint line of the 3D paint object. The computing device applies the selected options (e.g., color and texture) to the 3D mesh to generate the 3D paint object.

In one embodiment, generating the 3D paint object further comprises tapering the beginning and/or the end of the 3D paint line of the 3D paint object. In one example, the computing device uses a shader on the graphical processing unit (GPU) of the computing device to taper (e.g., deflate the vertices) the ends of the 3D paint line.

In one example embodiment, the style texture or texture type is a particle, such as glitter, stars, and the like. In this example, the computing device populates the 3D mesh with a spattering of glitter, stars, or the like. In one example embodiment, the style texture or texture type is a form of 2D or 3D object that is used to create/populate the 3D mesh. For example, the 2D or 3D object can be a block, flat plane, image, or other geometry. In this example, the computing device populates the 3D mesh with the 2D or 3D objects.

In operation 1010, the computing device causes the generated 3D paint object to be displayed. For example, the computing device causes the 3D paint object to be displayed on the display of the computing device. In example embodiments, the 3D paint object is generated in real time based on the movement of the computing device during selection in the space viewable in the camera view on the display of the computing device. In this way the user can immediately see what and where he or she is drawing a 3D paint line of the 3D paint object.

As explained above, a user may wish to send a message including the generated 3D paint object to another user. For example, the user may select an option in a GUI of a display on the computing device to capture an image or video of the scene or person in the camera view overlaid by the displayed generated 3D paint object to generate a message to send to another user. The computing device captures the image or video overlaid by the displayed 3D paint object. In operation 1012, the computing device generates the message comprising the image or video overlaid by the 3D paint object. The computing device sends the generated message to one or more computing devices associated with one or more users corresponding to the one or more users to whom the user wishes to send the message.

In one example embodiment, the user may wish to send the generated 3D paint object itself to another user or users. The computing device receives a request to send the generated 3D paint object to a second computing device and sends the 3D paint object to the second computing device. A second user using the second computing device can then use the 3D paint object to augment an image or video displayed or captured by the second computing device. The second user can then send a message comprising the augmented image or video to one or more other users, as explained above.

In one example embodiment, the second user can edit the received 3D paint object by undoing certain motions (e.g., undoing portions of the 3D paint line of the 3D paint object), changing one or more options of the 3D paint object (e.g., color, texture, shape), and so forth. The second user can then send a message comprising the revised 3D paint object or the revised 3D paint object itself to another user.

In one example embodiment, a predefined object upon which the user can draw a 3D paint line or lines is provided in the camera view. For example, the computing device may provide a gingerbread house and allow the user to draw a 3D paint line (or lines) to decorate the gingerbread house, using the methods described above.

In one example embodiment, the computing device uses known or future face tracking or skeleton tracking techniques to attach a generated 3D paint object to a face or body part. For example, a user can draw along an arm of a person in the camera view and when the person moves his arm or bends his elbow, the 3D paint line or object would also move and bend with the arm. As another example, a user can draw a 3D paint object in the form of a hat and put it on a head of a person in the camera view. When the person moves or the user moves the camera view, the hat would stay on the person's head. The user can then move the computing device to view the hat on the person's head from different angles and capture an image or video of the person with the hat on his head.

In one example embodiment, more than one user can draw a 3D paint line in the same space at the same time. For example, a first user viewing a space (e.g., a park scene) via a rear-facing camera on a first computing device can draw a first 3D paint line and a second user viewing the same space via a rear-facing camera on a second computing device can draw a second 3D paint line. Each of the first user and the second user can see both the first 3D paint line and the second 3D paint line as each are being drawn (e.g., in real time or near real time). For example, each user can select to share the drawing of the 3D paint line in real time and the respective computing device can send and receive data for the 3D paint lines and display each 3D paint line in the camera view on each computing device. In another example, the users can be at different locations (e.g., viewing different spaces) and still see both the first 3D paint line and the second 3D paint line in each respective space.

Figure 11:
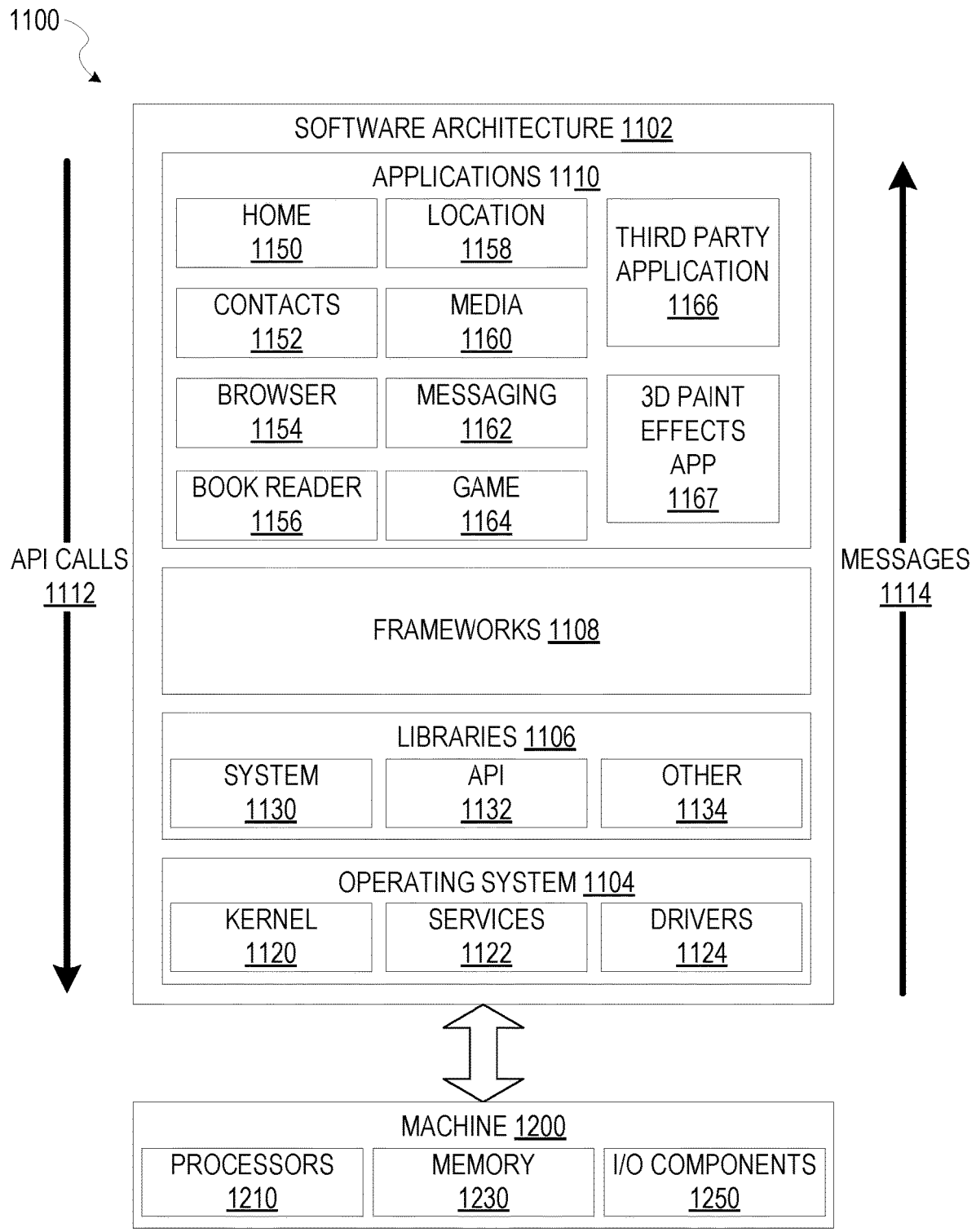
FIG. 11 is a block diagram illustrating an example of a software architecture that may be installed on a machine, according to some example embodiments.

FIG. 11 is a block diagram 1100 illustrating a software architecture 1102, which can be installed on any one or more of the devices described above. For example, in various embodiments, client devices 110 and servers and systems 102, 112, 116, 118, 122, and 124 may be implemented using some or all of the elements of the software architecture 1102. FIG. 11 is merely a non-limiting example of a software architecture, and it will be appreciated that many other architectures can be implemented to facilitate the functionality described herein. In various embodiments, the software architecture 1102 is implemented by hardware such as a machine 1200 of FIG. 12 that includes processors 1210, memory 1230, and input/output (I/O) components 1250. In this example, the software architecture 1102 can be conceptualized as a stack of layers where each layer may provide a particular functionality. For example, the software architecture 1102 includes layers such as an operating system 1104, libraries 1106, frameworks 1108, and applications 1110. Operationally, the applications 1110 invoke API calls 1112 through the software stack and receive messages 1114 in response to the API calls 1112, consistent with some embodiments.

In various implementations, the operating system 1104 manages hardware resources and provides common services. The operating system 1104 includes, for example, a kernel 1120, services 1122, and drivers 1124. The kernel 1120 acts as an abstraction layer between the hardware and the other software layers, consistent with some embodiments. For example, the kernel 1120 provides memory management, processor management (e.g., scheduling), component management, networking, and security settings, among other functionality. The services 1122 can provide other common services for the other software layers. The drivers 1124 are responsible for controlling or interfacing with the underlying hardware, according to some embodiments. For instance, the drivers 1124 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1106 provide a low-level common infrastructure utilized by the applications 1110. The libraries 1106 can include system libraries 1130 (e.g., C standard library) that can provide functions such as memory allocation functions, string manipulation functions, mathematic functions, and the like. In addition, the libraries 1106 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render two-dimensional (2D) and three-dimensional (3D) graphic content on a display), database libraries (e.g., SQLite to provide various relational database functions), web libraries (e.g., WebKit to provide web browsing functionality), and the like. The libraries 1106 can also include a wide variety of other libraries 1134 to provide many other APIs to the applications 1110.

The frameworks 1108 provide a high-level common infrastructure that can be utilized by the applications 1110, according to some embodiments. For example, the frameworks 1108 provide various graphic user interface (GUI) functions, high-level resource management, high-level location services, and so forth. The frameworks 1108 can provide a broad spectrum of other APIs that can be utilized by the applications 1110, some of which may be specific to a particular operating system 1104 or platform.

In an example embodiment, the applications 1110 include a home application 1150, a contacts application 1152, a browser application 1154, a book reader application 1156, a location application 1158, a media application 1160, a messaging application 1162, a game application 1164, and a broad assortment of other applications such as a third-party application 1166. According to some embodiments, the applications 1110 are programs that execute functions defined in the programs. Various programming languages can be employed to create one or more of the applications 1110, structured in a variety of manners, such as object-oriented programming languages (e.g., Objective-C, Java, or C++) or procedural programming languages (e.g., C or assembly language). In a specific example, the third-party application 1166 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1166 can invoke the API calls 1112 provided by the operating system 1104 to facilitate functionality described herein.

Some embodiments may particularly include 3D paint effects application 1167. In certain embodiments, this may be a standalone application that operates to manage communications with a server system, such as third-party servers or the server system 108. In other embodiments, this functionality may be integrated with another application (e.g., the messaging application 1162). The 3D paint effects application 1167 may request and display various data related to messaging, media content, media collections, media overlays, interactive messages, chat messages, and so forth, and may provide the capability for a user to input data related to the system via a touch interface, via a keyboard, or using a camera device of the machine 1200, communicate with a server system via the I/O components 1250, and receive and store object data in the memory 1230. Presentation of information and user inputs associated with the information may be managed by the 3D paint effects application 1167 using different frameworks 1108, library 1106 elements, or operating system 1104 elements operating on the machine 1200.

Figure 12:
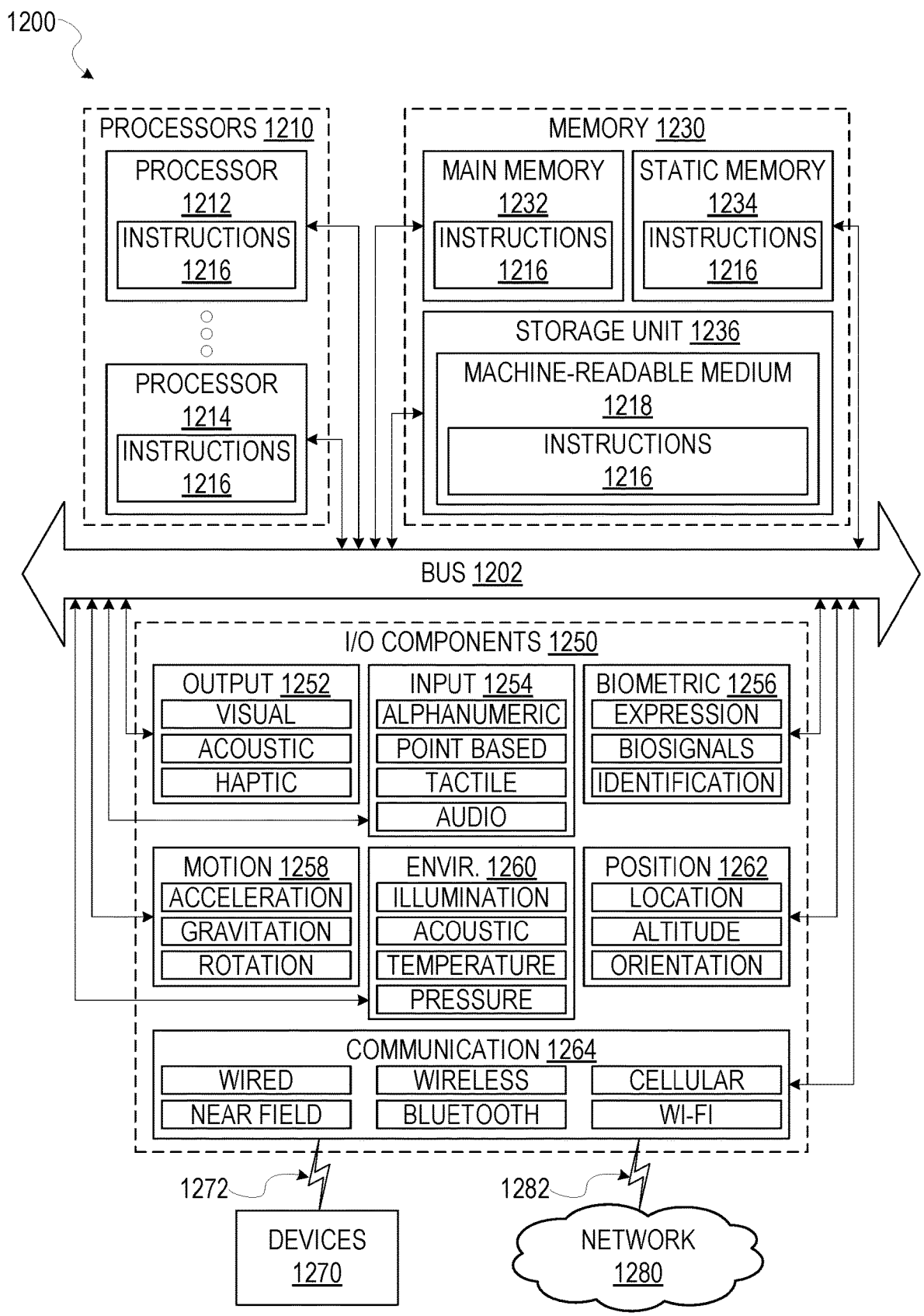
FIG. 12 illustrates a diagrammatic representation of a machine, in the form of a computer system, within which a set of instructions may be executed for causing the machine to perform any one or more of the methodologies discussed herein, according to an example embodiment.

FIG. 12 is a block diagram illustrating components of a machine 1200, according to some embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein can be executed. In alternative embodiments, the machine 1200 operates as a standalone device or can be coupled (e.g., networked) to other machines. In a networked deployment, the machine 1200 may operate in the capacity of a server system 102, 112, 116, 118, 122, 124, and the like, or a client device 110 in a server-client network environment, or as a peer machine in a peer-to-peer (or distributed) network environment. The machine 1200 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

In various embodiments, the machine 1200 comprises processors 1210, memory 1230, and I/O components 1250, which can be configured to communicate with each other via a bus 1202. In an example embodiment, the processors 1210 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1212 and a processor 1214 that may execute the instructions 1216. The term "processor" is intended to include multi-core processors 1210 that may comprise two or more independent processors 1212, 1214 (also referred to as "cores") that can execute instructions 1216 contemporaneously. Although FIG. 12 shows multiple processors 1210, the machine 1200 may include a single processor 1210 with a single core, a single processor 1210 with multiple cores (e.g., a multi-core processor 1210), multiple processors 1212, 1214 with a single core, multiple processors 1212, 1214 with multiple cores, or any combination thereof.

The memory 1230 comprises a main memory 1232, a static memory 1234, and a storage unit 1236 accessible to the processors 1210 via the bus 1202, according to some embodiments. The storage unit 1236 can include a machine-readable medium 1218 on which are stored the instructions 1216 embodying any one or more of the methodologies or functions described herein. The instructions 1216 can also reside, completely or at least partially, within the main memory 1232, within the static memory 1234, within at least one of the processors 1210 (e.g., within the processor's cache memory), or any suitable combination thereof, during execution thereof by the machine 1200. Accordingly, in various embodiments, the main memory 1232, the static memory 1234, and the processors 1210 are considered machine-readable media 1218.

As used herein, the term "memory" refers to a machine-readable medium 1218 able to store data temporarily or permanently and may be taken to include, but not be limited to, random-access memory (RAM), read-only memory (ROM), buffer memory, flash memory, and cache memory. While the machine-readable medium 1218 is shown, in an example embodiment, to be a single medium, the term "machine-readable medium" should be taken to include a single medium or multiple media (e.g., a centralized or distributed database, or associated caches and servers) able to store the instructions 1216. The term "machine-readable medium" shall also be taken to include any medium, or combination of multiple media, that is capable of storing instructions (e.g., instructions 1216) for execution by a machine (e.g., machine 1200), such that the instructions 1216, when executed by one or more processors of the machine 1200 (e.g., processors 1210), cause the machine 1200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1250 include a wide variety of components to receive input, provide output, produce output, transmit information, exchange information, capture measurements, and so on. In general, it will be appreciated that the I/O components 1250 can include many other components that are not shown in FIG. 12. The I/O components 1250 are grouped according to functionality merely for simplifying the following discussion, and the grouping is in no way limiting. In various example embodiments, the I/O components 1250 include output components 1252 and input components 1254. The output components 1252 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1254 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1250 include biometric components 1256, motion components 1258, environmental components 1260, or position components 1262, among a wide array of other components. For example, the biometric components 1256 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1258 include acceleration sensor components (e.g., accelerometer), gravitation sensor components, rotation sensor components (e.g., gyroscope), and so forth. The environmental components 1260 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1262 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 include a network interface component or another suitable device to interface with the network 1280. In further examples, communication components 1264 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1270 may be another machine 1200 or any of a wide variety of peripheral devices (e.g., a peripheral device coupled via a Universal Serial Bus (USB)).

Moreover, in some embodiments, the communication components 1264 detect identifiers or include components operable to detect identifiers. For example, the communication components 1264 include radio frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1264, such as location via Internet Protocol (IP) geolocation, location via WI-FI® signal triangulation, location via detecting a BLUETOOTH® or NFC beacon signal that may indicate a particular location, and so forth.

In various example embodiments, one or more portions of the network 1280 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile communications (GSM) connection, or another type of cellular or wireless coupling. In this example, the coupling 1282 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1216 are transmitted or received over the network 1280 using a transmission medium via a network interface device (e.g., a network interface component included in the communication components 1264) and utilizing any one of a number of well-known transfer protocols (e.g., Hypertext Transfer Protocol (HTTP)). Similarly, in other example embodiments, the instructions 1216 are transmitted or received using a transmission medium via the coupling 1272 (e.g., a peer-to-peer coupling) to the devices 1270. The term "transmission medium" shall be taken to include any intangible medium that is capable of storing, encoding, or carrying the instructions 1216 for execution by the machine 1200, and includes digital or analog communications signals or other intangible media to facilitate communication of such software.

Furthermore, the machine-readable medium 1218 is non-transitory (in other words, not having any transitory signals) in that it does not embody a propagating signal. However, labeling the machine-readable medium 1218 "non-transitory" should not be construed to mean that the medium is incapable of movement; the machine-readable medium 1218 should be considered as being transportable from one physical location to another. Additionally, since the machine-readable medium 1218 is tangible, the machine-readable medium 1218 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    determining, by a first computing device, a location of a selection in a space viewable in a camera view on a display of the first computing device;
    detecting, by the first computing device, movement of the first computing device;
    generating, by the first computing device, a path starting from the location of the selection and following the movement of the first computing device by performing operations comprising:
        generating, by the first computing device, a three-dimensional (3D) mesh along the path following the movement of the first computing device using multiple X, Y, and Z coordinates calculated based on the movement of the first computing device;
        populating, by the first computing device, the 3D mesh with a selected color and texture type to generate a first 3D paint object; and
        causing, by the first computing device, the generated first 3D paint object to be displayed;
    receiving, by the first computing device, data for a second 3D paint object being drawn on a second computing device in the space;
    causing, by the first computing device, display of the second 3D paint object being drawn on the second computing device during display of the first 3D paint object;
    receiving, by the first computing device, a request to send a message comprising an image or video overlaid by the first 3D paint object;
    capturing, by a camera of the first computing device, the image or video overlaid by the displayed first 3D paint object;
    generating, by the first computing device, the message comprising the image or video overlaid by the first 3D paint object; and
    sending, by the first computing device, the message to a third computing device.

2. The method of claim 1, wherein the location comprises an X, Y, and Z coordinate in the space viewable in the camera view on the display of the first computing device.

3. The method of claim 1, wherein the first 3D paint object is generated in real time based on the movement of the first computing device during the selection in the space viewable in the camera view on the display of the first computing device.

4. The method of claim 1, wherein the method further comprises:
    receiving a request to send the generated first 3D paint object to a fourth computing device; and
    sending the first 3D paint object to the fourth computing device, wherein the first 3D paint object is overlaid on an image or video captured by the fourth computing device.

5. The method of claim 1, wherein generating the first 3D paint object further comprises tapering at least one of a beginning or an ending of a 3D paint line of the first 3D paint object.

6. The method of claim 1, wherein the 3D mesh comprises a cylindrical or polygon shape causing a 3D paint line of the first 3D paint object to be in a cylindrical or polygon shape.

7. The method of claim 1, wherein the texture type is a type particle and the first 3D paint object comprises 3D particles along the path.

8. The method of claim 1, wherein the 3D mesh comprises more than one shape and the first 3D paint object is generated using more than one shape.

9. The method of claim 8, wherein each shape of the more than one shape comprises a color and texture type.

10. The method of claim 1, further comprising:
    applying a smoothing algorithm to the path.

11. The method of claim 1, wherein the first 3D paint object is displayed on the second computing device during display of the second 3D paint object on the second computing device.

12. The method of claim 1, wherein the second computing device is in a different location than the first computing device.

13. A computing device comprising:
    a memory that stores instructions; and one or more processors configured by the instructions to perform operations comprising:
determining a location of a selection in a space viewable in a camera view on a display of the computing device;
detecting movement of the computing device;
generating a path starting from the location of the selection and following the movement of the computing device by performing operations comprising:
generating a three-dimensional (3D) mesh along the path following the movement of the computing device using multiple X, Y, and Z coordinates calculated based on the movement of the computing device;
populating the 3D mesh with a selected color and texture type to generate a first 3D paint object; and
causing the generated first 3D paint object to be displayed;
receiving data for a second 3D paint object being drawn on a second computing device in the space;
causing display of the second 3D paint object being drawn on the second computing device during display of the first 3D paint object;
receiving a request to send a message comprising an image or video overlaid by the first 3D paint object;
capturing the image or video overlaid by the displayed first 3D paint object;
generating the message comprising the image or video overlaid by the first 3D paint object; and
sending the message to a third computing device.

14. The computing device of claim 13, wherein the location comprises an X, Y, and Z coordinate in the space viewable in the camera view on the display of the computing device.

15. The computing device of claim 13, wherein the first 3D paint object is generated in real time based on the movement of the computing device during the selection in the space viewable in the camera view on the display of the computing device.

16. The computing device of claim 13, the operations further comprising:
receiving a request to send the generated first 3D paint object to a fourth computing device; and
sending the first 3D paint object to the fourth computing device, wherein the first 3D paint object is overlaid on an image or video captured by the fourth computing device.

17. The computing device of claim 13, wherein the 3D mesh comprises a cylindrical or polygon shape causing a 3D paint line of the first 3D paint object to be in a cylindrical or polygon shape.

18. A non-transitory computer-readable medium comprising instructions stored thereon that are executable by at least one processor to cause a computing device to perform operations comprising:
determining a location of a selection in a space viewable in a camera view on a display of the computing device;
detecting movement of the computing device;
generating a path starting from the location of the selection and following the movement of the computing device by performing operations comprising:
generating a three-dimensional (3D) mesh along the path following the movement of the computing device using multiple X, Y, and Z coordinates calculated based on the movement of the computing device;
populating the 3D mesh with a selected color and texture type to generate a first 3D paint object; and
causing the generated first 3D paint object to be displayed;
receiving data for a second 3D paint object being drawn on a second computing device in the space;
causing display of the second 3D paint object being drawn on the second computing device during display of the first 3D paint object;
receiving a request to send a message comprising an image or video overlaid by the first 3D paint object;
capturing the image or video overlaid by the displayed first 3D paint object;
generating the message comprising the image or video overlaid by the first 3D paint object; and
sending the message to a third computing device.

19. The non-transitory computer-readable medium of claim 18, wherein the location comprises an X, Y.

20. The non-transitory computer-readable medium of claim 18, wherein the first 3D paint object is generated in real time based on the movement of the computing device during the selection in the space viewable in the camera view on the display of the computing device.

* * * * *